(12) United States Patent
Yang

(10) Patent No.: US 12,477,225 B2
(45) Date of Patent: Nov. 18, 2025

(54) CAMERA STRUCTURE AND ELECTRONIC DEVICE WITH ANTI-SHAKE FUNCTION

(71) Applicant: VIVO MOBILE COMMUNICATION CO., LTD., Guangdong (CN)

(72) Inventor: Ze Yang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 134 days.

(21) Appl. No.: 18/381,421

(22) Filed: Oct. 18, 2023

(65) Prior Publication Data

US 2024/0048846 A1   Feb. 8, 2024

Related U.S. Application Data

(63) Continuation of application No. PCT/CN2022/086345, filed on Apr. 12, 2022.

(30) Foreign Application Priority Data

Apr. 19, 2021 (CN) .......................... 202110417591.2

(51) Int. Cl.
   *H04N 23/68* (2023.01)
   *H04N 23/54* (2023.01)

(52) U.S. Cl.
   CPC .......... *H04N 23/687* (2023.01); *H04N 23/54* (2023.01); *H04N 23/6812* (2023.01)

(58) Field of Classification Search
   CPC .. H04N 23/687; H04N 23/54; H04N 23/6812; H04N 23/685; H04N 23/57; H04N 23/50; G03B 2205/0023; G03B 2205/0069; G03B 5/06; G03B 30/00
   See application file for complete search history.

(56) References Cited

U.S. PATENT DOCUMENTS

| | | | |
|---|---|---|---|
| 9,746,690 B2* | 8/2017 | Enta | G03B 5/00 |
| 2017/0163896 A1* | 6/2017 | Kang | G03B 15/006 |
| 2017/0302852 A1* | 10/2017 | Lam | H04N 23/51 |

(Continued)

FOREIGN PATENT DOCUMENTS

| | | |
|---|---|---|
| CN | 107340667 A | 11/2017 |
| CN | 111586269 A | 8/2020 |

(Continued)

*Primary Examiner* — Padma Haliyur
(74) *Attorney, Agent, or Firm* — The Webb Law Firm

(57) ABSTRACT

A camera structure includes a universal shaft, an outer gimbal support, an inner gimbal support, a gimbal carrier, a first driving mechanism, a second driving mechanism, and a camera module. The camera module is movably connected to the outer gimbal support, and the camera module is fixedly connected to the gimbal carrier. Two supporting portions of the universal shaft that are axially distributed along a first axis are hinged to the outer gimbal support, and two supporting portions of the universal shaft that are axially distributed along a second axis are hinged to the inner gimbal support. The first driving mechanism is configured to drive the inner gimbal support to rotate relative to the outer gimbal support along the first axis and/or the second axis. The second driving mechanism is configured to drive the gimbal carrier to rotate relative to the inner gimbal support along a third axis.

20 Claims, 17 Drawing Sheets

(56) References Cited

U.S. PATENT DOCUMENTS

| | | | |
|---|---|---|---|
| 2018/0319512 A1* | 11/2018 | Kang | G03B 17/56 |
| 2020/0196447 A1 | 6/2020 | Mak | |
| 2020/0341289 A1* | 10/2020 | Minamisawa | G02B 27/646 |
| 2021/0041714 A1* | 2/2021 | Sue | G02B 7/02 |
| 2021/0041717 A1* | 2/2021 | Takei | G02B 27/646 |
| 2021/0318592 A1 | 10/2021 | Kim et al. | |
| 2021/0341822 A1* | 11/2021 | Terajima | G03B 17/561 |
| 2022/0171150 A1 | 6/2022 | Wang et al. | |

FOREIGN PATENT DOCUMENTS

| | | |
|---|---|---|
| CN | 111917966 A | 11/2020 |
| CN | 112198735 A | 1/2021 |
| CN | 112655191 A | 4/2021 |
| CN | 112822363 A | 5/2021 |
| CN | 112954185 A | 6/2021 |
| CN | 113286062 A | 8/2021 |
| JP | 2013246413 A | 12/2013 |
| JP | 2018077395 A | 5/2018 |
| JP | 2020204645 A | 12/2020 |
| JP | 2022040526 A | 3/2022 |

* cited by examiner

A-A

CAMERA STRUCTURE AND ELECTRONIC DEVICE WITH ANTI-SHAKE FUNCTION

CROSS-REFERENCE TO RELATED APPLICATIONS

This application is a Bypass Continuation Application of International Patent Application No. PCT/CN2022/086345, filed Apr. 12, 2022, and claims priority to Chinese Patent Application No. 202110417591.2, filed Apr. 19, 2021, the disclosures of which are hereby incorporated by reference in their entireties.

BACKGROUND OF THE INVENTION

Field of the Invention

This application relates to the field of camera technologies, and particularly, to a camera structure and an electronic device.

Description of Related Art

With the continuous development of electronic devices, requirements of people for the shooting performance of the electronic devices are becoming higher and higher. The application of micro gimbals on the electronic devices has greatly improved the experience of consumers in improving the quality of handheld photography. Generally, a shaking amount corresponding to hand shaking can be decomposed into three directions X, Y, and Z in space, with a total of 6 degrees of freedom (movement along an X/Y/Z axis and rotation around the X/Y/Z axis: Rx, Ry, Rz). In addition to axial shaking in a focusing direction (Z axis), the shaking of the other 5 degrees of freedom has a significant impact on handheld photography, especially for night shooting and video shooting, ultimately affecting the imaging effect and consumer experience.

SUMMARY OF THE INVENTION

According to a first aspect, an embodiment of this application provides a camera structure, including a universal shaft, an outer gimbal support, an inner gimbal support accommodated in the outer gimbal support, a gimbal carrier, a first driving mechanism, a second driving mechanism, and a camera module, where the camera module is movably connected to the outer gimbal support, and the camera module is fixedly connected to the gimbal carrier;

two supporting portions of the universal shaft that are axially distributed along a first axis are hinged to the outer gimbal support, and two supporting portions of the universal shaft that are axially distributed along a second axis are hinged to the inner gimbal support, where the first axis intersects with the second axis;

the first driving mechanism is connected to the outer gimbal support and the inner gimbal support, to drive the inner gimbal support to rotate relative to the outer gimbal support along the first axis and/or the second axis;

the gimbal carrier is slidably connected to a bottom portion of the inner gimbal support; and the second driving mechanism is connected to the inner gimbal support and the gimbal carrier, to drive the gimbal carrier to rotate relative to the inner gimbal support along a third axis, where the third axis is perpendicular to the first axis and the second axis.

According to a second aspect, an embodiment of this application provides an electronic device, and the electronic device includes the camera structure according to the first aspect.

DESCRIPTION OF THE INVENTION

The following clearly describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application shall fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. Objects distinguished by "first", "second", and the like are usually one type, and the number of objects is not limited. For example, the first object may be one or more than one. In addition, in the specification and the claims, "and/or" means at least one of the connected objects, and the character "/" generally indicates an "or" relationship between the associated objects.

At present, micro gimbal cameras used in the electronic devices (such as mobile phones) are two-axis gimbals, which can only prevent shaking of 4 degrees of freedom and cannot prevent shaking (Rz) rotating along the Z axis. Therefore, when there is shaking in the Rz direction, the imaging quality of the micro gimbal cameras is poor. It can be seen that the anti-shake effect of the micro gimbal cameras is poor.

A camera structure and an electronic device provided in the embodiments of this application are described below through embodiments and application scenarios thereof with reference to the accompanying drawings.

Figure 1:
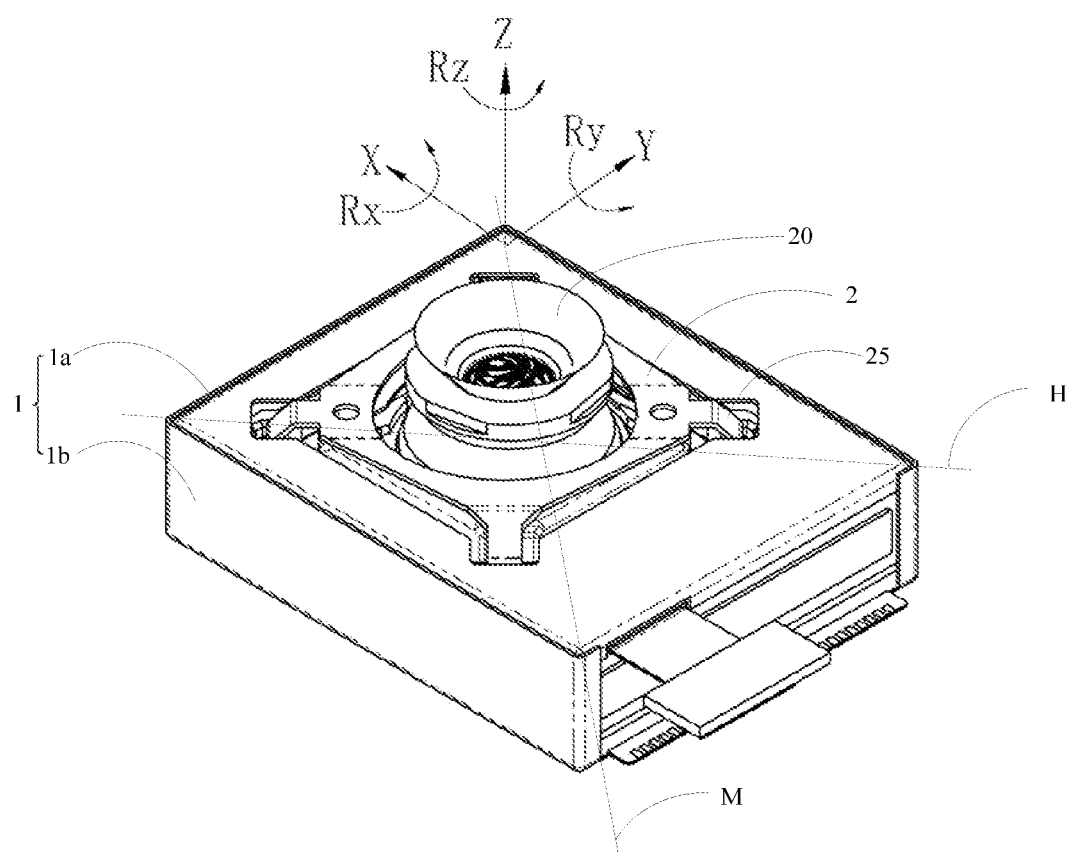
FIG. 1 is a side view of a camera structure according to embodiments of this application.
Figure 2:
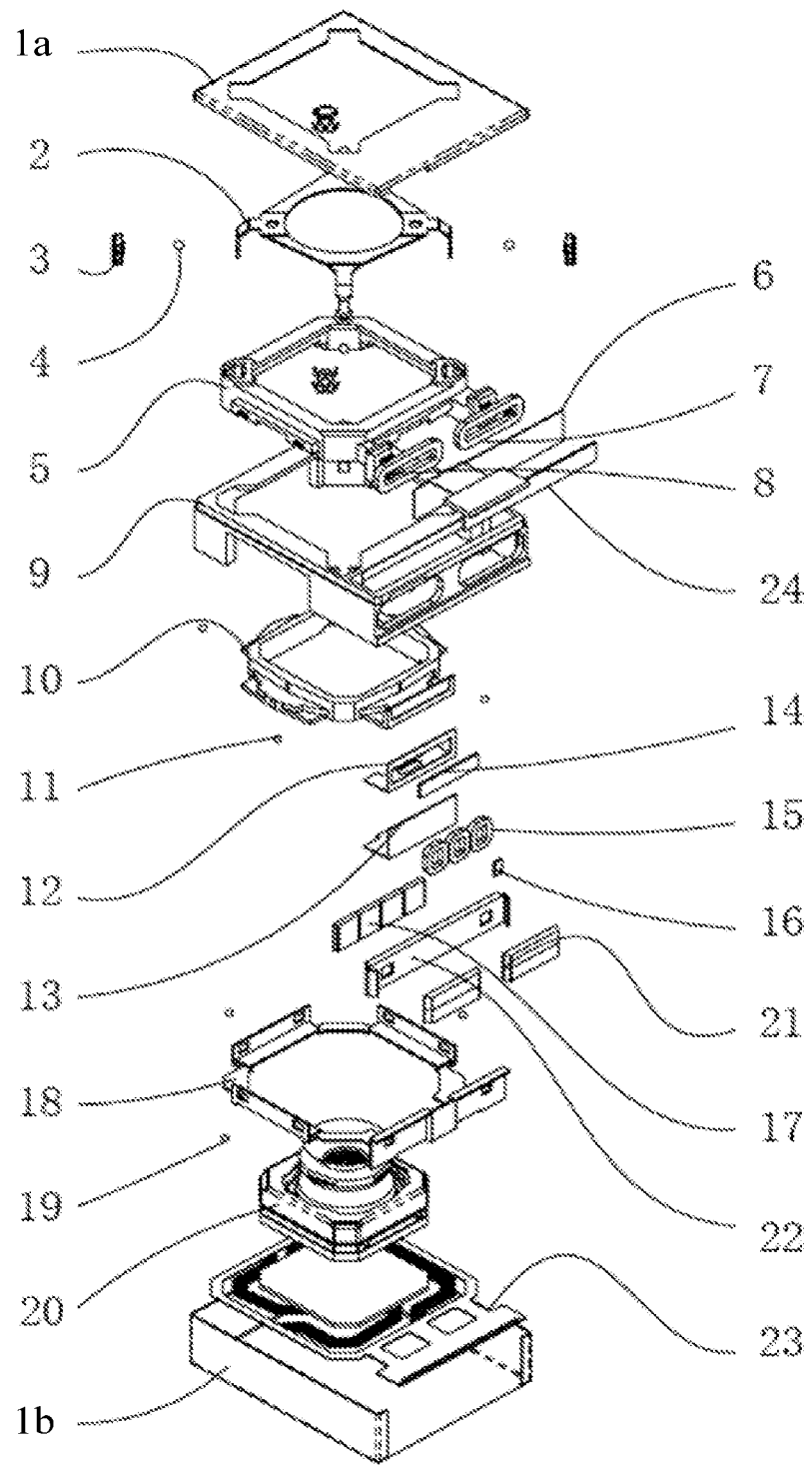
FIG. 2 is a splitting view of a camera structure according to embodiments of this application.
Figure 3A:
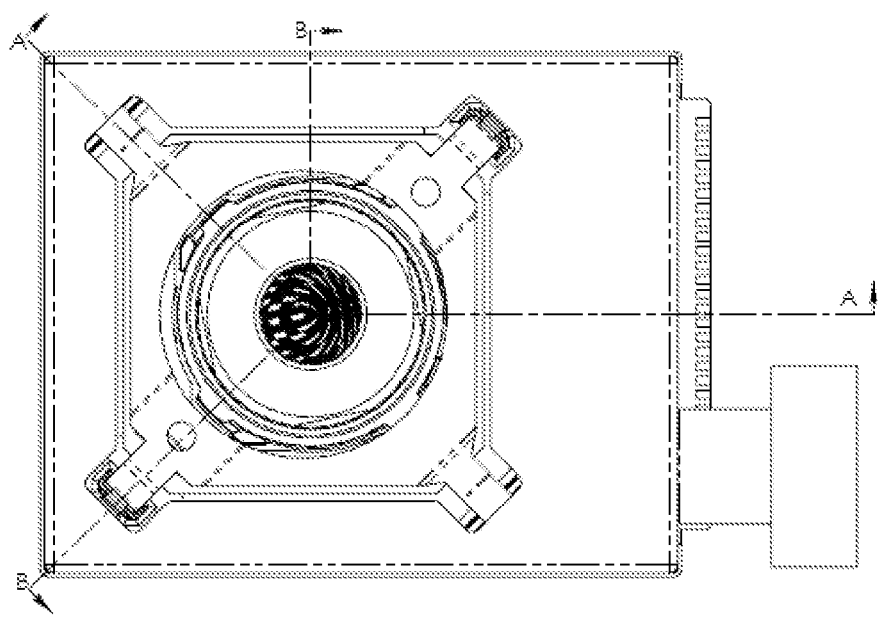
FIG. 3A is a top view of a camera structure according to embodiments of this application.
Figure 3B:
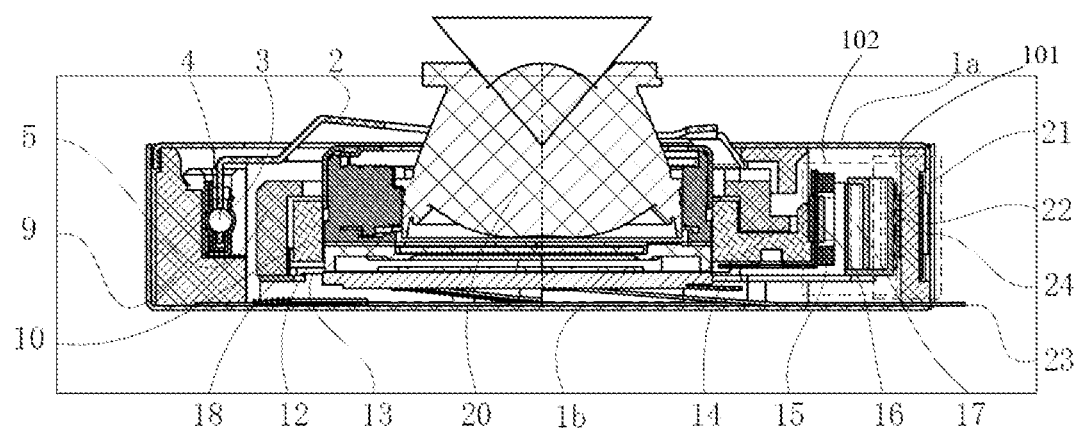
FIG. 3B is a cross-sectional view along an A-A direction in FIG. 3A.
Figure 3C:
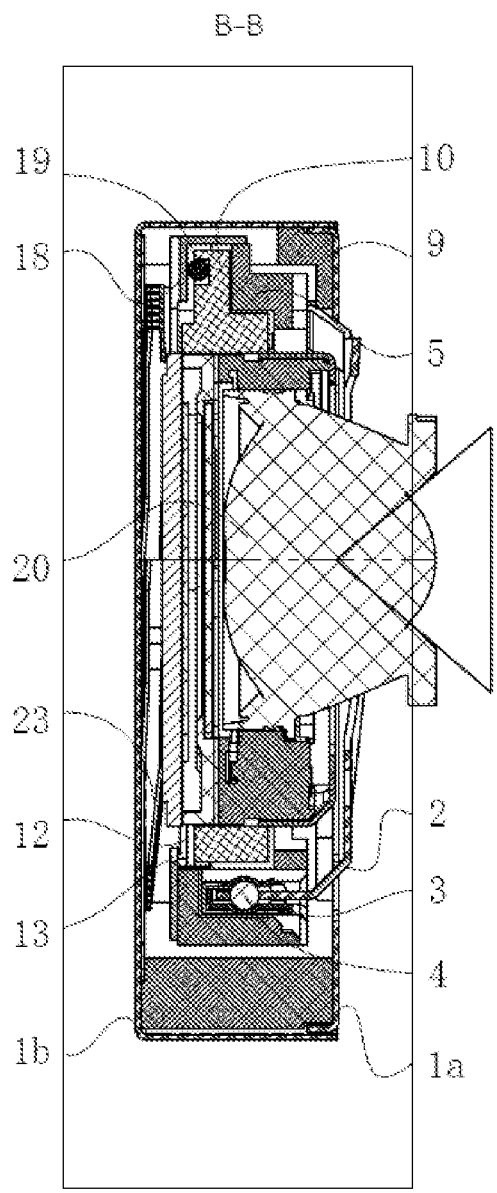
FIG. 3C is a cross-sectional view along a B-B direction in FIG. 3A.
Figure 3D:
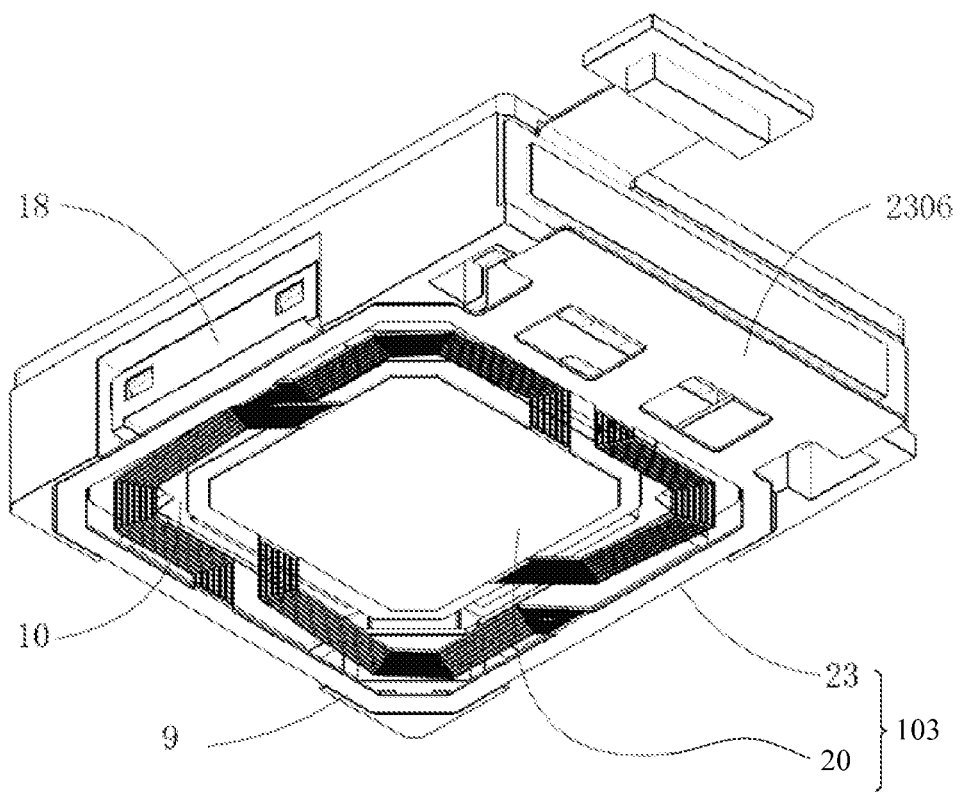
FIG. 3D is a bottom view of a camera structure according to embodiments of this application.

Refer to FIG. 1 to FIG. 3D. FIG. 1 is a structural diagram of a camera structure according to embodiments of this application; FIG. 2 is a splitting view of a camera structure according to embodiments of this application; FIG. 3A is a top view of a camera structure according to embodiments of this application; FIG. 3B is a cross-sectional view along an A-A direction in FIG. 3A; FIG. 3C is a cross-sectional view along a B-B direction in FIG. 3A; FIG. 3D is a bottom view of a camera structure according to embodiments of this application. The camera structure provided in the embodiments of this application includes: a universal shaft 2, an outer gimbal support 9, an inner gimbal support 5 accommodated in the outer gimbal support 9, a gimbal carrier 10, a first driving mechanism 101, a second driving mechanism 102, and a camera module 103.

The camera module 103 is movably connected to the outer gimbal support 9, and the camera module 103 is fixedly connected to the gimbal carrier 10; two supporting portions 25 of the universal shaft 2 that are axially distributed along a first axis are hinged to the outer gimbal support 9, and two supporting portions 25 of the universal shaft 2 that are axially distributed along a second axis are hinged to the inner gimbal support 5, where the first axis intersects with the second axis; and the first driving mechanism 101 is connected to the outer gimbal support 9 and the inner gimbal support 5 to drive the inner gimbal support 5 to rotate relative to the outer gimbal support 9 along the first axis and/or the second axis.

In addition, the gimbal carrier 10 is slidably connected to a bottom portion of the inner gimbal support 5; and the second driving mechanism 102 is connected to the inner gimbal support 5 and the gimbal carrier 10, to drive the gimbal carrier 10 to rotate relative to the inner gimbal support 5 along a third axis, where the third axis is perpendicular to the first axis and the second axis.

In an implementation, the first axis may extend in the same direction as an H line shown in FIG. 1, the second axis may extend in the same direction as an M line shown in FIG. 1, and the third axis may be a Z axis shown in FIG. 1. Certainly, in a practical application, the first axis and the second axis may not be perpendicular to each other, for example: an angle between the first axis and the second axis is greater than 0° and less than 180°.

In an implementation, driving the inner gimbal support 5 to rotate relative to the outer gimbal support 9 along the first axis and/or the second axis may be understood as: driving the inner gimbal support 5 to rotate relative to the outer gimbal support 9 along an X axis or a Y axis, where the outer gimbal support 9 may have a rectangular structure, with the X axis and the Y axis respectively parallel to two mutually perpendicular rectangular edges on the outer gimbal support 9.

For example, during the rotation of the inner gimbal support 5 relative to the outer gimbal support 9 along the first axis, the inner gimbal support 5 has rotational components along the X axis direction and the Y axis direction. Similarly, during the rotation of the inner gimbal support 5 relative to the outer gimbal support 9 along the second axis, the inner gimbal support 5 also has rotational components along the X axis direction and the Y axis direction. In this case, if only the inner gimbal support 5 needs to be driven to rotate relative to the outer gimbal support 9 along the X axis, the component in the Y axis direction during the rotation of the inner gimbal support 5 relative to the outer gimbal support 9 along the first axis may be offset against the component in the Y axis direction during the rotation of the inner gimbal support 5 relative to the outer gimbal support 9 along the second axis, thereby driving the inner gimbal support 5 to rotate relative to the outer gimbal support 9 along the X axis.

That the camera module 103 is fixedly connected to the gimbal carrier 10 may be understood as that: an outer wall of the camera module 103 is attached and fixedly connected to an inner wall of the gimbal carrier 10.

In a practical application, as shown in FIG. 1 and FIG. 2, the camera structure provided in the embodiments of this application may include: a shell 1, where the shell 1 may include a top shell 1a and a bottom shell 1b, where the bottom shell 1b is recessed in a direction away from the top shell 1a to form an accommodating space between the top shell 1a and the bottom shell 1, and the universal shaft 2, the outer gimbal support 9, the inner gimbal support 5 accommodated in the outer gimbal support 9, the gimbal carrier 10, the first driving mechanism 101, the second driving mechanism 102, and the camera module 103 may be accommodated in the accommodating space of the shell 1. In addition, the top shell the universal shaft 2, the outer gimbal support 9, the inner gimbal support 5, and the gimbal carrier 10 are all provided with a light hole to enable the bottom camera module 103 to collect image information through the light hole. Even through the light hole, a head portion of the camera module 103 (that is, above the two axes in FIG. 1) is exposed to the top shell 1a.

In this way, the camera structure provided in the embodiments of this application can be enclosed as a whole through the shell 1, and the shell 1 can also protect the camera module 103 and other components inside.

In an implementation, the first driving mechanism 101 and the second driving mechanism 102 may be an electric motor driving mechanism, an electromagnetic driving mechanism, and the like. For the convenience of description, the following embodiments only take an example in which the first driving mechanism 101 and the second driving mechanism 102 are electromagnetic driving mechanisms for description, which is not limited herein.

In addition, in the coordinate axis shown in FIG. 1, Rx, Ry, and Rz respectively represent the directions of rotation along the X axis, the Y axis, and the Z axis.

In the embodiments of this application, the second driving mechanism independently drives the gimbal carrier to rotate along the Rz axis direction to achieve Rz axis anti-shake, so that the Rz axis anti-shake system is independent of the Rx axis anti-shake system and Ry axis anti-shake system. In this way, when anti-shake functions are performed on the Rx axis or the Ry axis, the position feedback system of the Rz is not affected, thereby effectively improving the anti-shake accuracy of the Rz axis, more effectively improving the image quality of night shooting and video shooting when hand shaking occurs, and enhancing the consumer experience.

In addition, that two supporting portions 25 of the universal shaft 2 that are axially distributed along a first axis are hinged to the outer gimbal support 9, and two supporting portions 25 of the universal shaft 2 that are axially distributed along a second axis are hinged to the inner gimbal support 5 may be understood as that: The two supporting portions 25 of the universal shaft 2 that are axially distributed along the first axis form a first rotation axis. Therefore, when the two supporting portions 25 are hinged to the outer gimbal support 9, the universal shaft 2 can rotate relative to the outer gimbal support 9 along the first rotation axis. And the two supporting portions 25 of the universal shaft 2 that are axially distributed along the second axis form a second rotation axis. Therefore, when the two supporting portions 25 are hinged to the inner gimbal support 5, the universal shaft 2 can rotate relative to the inner gimbal support 5 along the second rotation axis, which enables the inner gimbal support 5 to rotate relative to the outer gimbal support 9 along the first rotation axis and the second rotation axis.

On this basis, the camera module 103 can rotate along the Rz axis direction relative to the inner gimbal support 5 through the gimbal carrier 10. Therefore, the camera module 103 rotates along the Rx axis, the Ry axis, and the Rz axis. In an actual shooting, shake parameters such as a shake direction and a shake distance of the camera may be obtained, and based on this, the camera structure provided in the embodiments of this application can be controlled to rotate a corresponding rotation amount along the Rx axis direction, the Ry axis direction, and the Rz axis direction to achieve anti-shake along the Rx axis direction, the Ry axis direction, and the Rz axis direction.

Figure 6A:
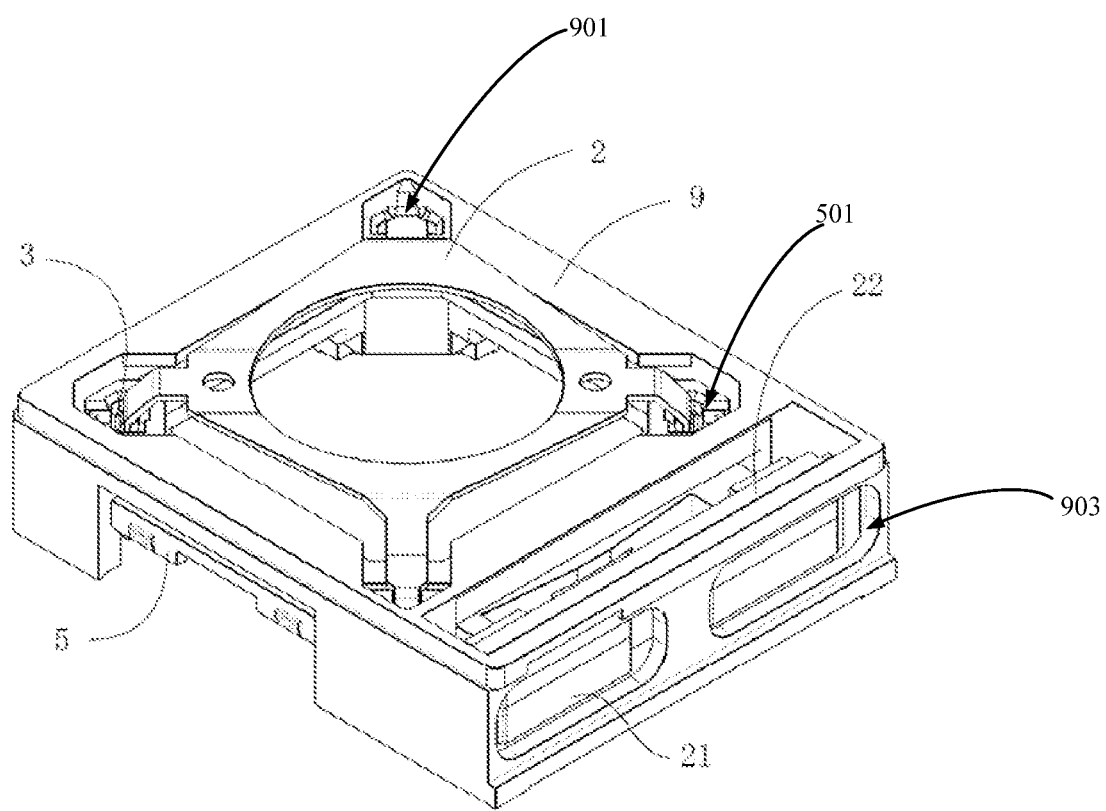
FIG. 6A is an assembly diagram of a universal shaft, an outer gimbal support, and inner gimbal support.

In an implementation, as shown in FIG. 6A, there is a first accommodating space 905 between a first inner side wall of the outer gimbal support 9 and a first outer side wall of the inner gimbal support 5, and the first driving mechanism 101 and the second driving mechanism 102 are disposed in the first accommodating space 905.

In an implementation, the head portion of the camera module 103 can extend out of the outer gimbal support 9 through the light hole on the upper side of the outer gimbal support 9, that is, the first driving mechanism 101 and the second driving mechanism 102 can be aligned with the tail portion of the camera module 103 (that is, below the Z axis in FIG. 1), so that the electromagnetic driving modules of the first driving mechanism 101 and the second driving mechanism 102 can be disposed in an area that is far from the head portion of the gimbal, to provide more demagnetized areas at the head portion of the gimbal, and the camera module equipped with the gimbal can choose more types of driving motors, such as: an optical image stabilization (OIS) camera module. In this way, the anti-shake function of the camera structure along the Rx direction, the Ry direction, and the Rz direction provided in the embodiments of this application can be combined to construct a 5-axis anti-shake camera system (that is, anti-shake along the X, Y, Rx, Ry, and Rz directions), which can then drive the camera system to compensate for the shake of the 5 degrees of freedom separately or in combination, avoiding the impact of time difference and failure to switch compensation states in a timely manner in synthetic motion compensation, so that image quality of the captured images and videos can be improved, especially in a case of shaking hands during night shooting, which can effectively improve the overall consumer experience.

In an implementation, as shown in FIG. 2 and FIG. 3B, the first driving mechanism 101 includes: a first magnet yoke 22, a first driving coil group 7, and a first magnet group 21, where
    the first driving coil group 7 is fixed to the outer gimbal support 9, the first magnet yoke 22 is fixed to the first outer side wall of the inner gimbal support 5, the first magnet group 21 is fixed to the first magnet yoke 22, and the first magnet group 21 matches with the first driving coil group 7; and
    at least two coils of the first driving coil group 7 are arranged at interval along a first direction, the first direction is perpendicular to the third axis (Z axis), the first driving coil group 7 is distributed on two opposite sides of a symmetry axis of the inner gimbal support 5, and the symmetry axis is in a same direction as a direction from the first outer side wall of the inner gimbal support 5 to the first inner side wall of the outer gimbal support 9, where
    in a case that the first driving coil group 7 is energized with current, an interaction force is generated between the first driving coil group 7 and the first magnet group 21, and the first magnet group 21 drives, based on the interaction force, the inner gimbal support 5 to rotate relative to the outer gimbal support 9 along the first axis and/or along the second axis (or may be understood as that: the first driving coil group 7 drives the inner gimbal support 5 to rotate relative to the outer gimbal support 9 along the first axis and/or along the second axis based on the interaction force).

In an implementation, the first direction may be in the same direction as the Y axis shown in FIG. 1, and that the first magnet group 21 matches with the first driving coil group 7 may be understood as that: the magnetic field generated by the first driving coil group 7 can act on the first magnet group 21, and a magnetic circuit is generated between the first magnet yoke 22 and the first magnet group 21, or the magnets in the first magnet group 21 correspond to the coils of the first driving coil group 7 one by one, and the corresponding magnets and coils are arranged directly facing each other.

In an implementation, a current whose magnitude and direction are controllable separately can be applied to the first driving coil group 7 to generate an interaction force with a controllable direction and magnitude between the first magnet group 21 fixed to the first magnet yoke 22 and the first driving coil group 7 fixed to the outer gimbal support 9, thereby driving the first magnet yoke 22 (the first magnet group 21) to generate a rotational motion with a controllable direction along the Rx axis and the Ry axis relative to the outer gimbal support 9, thereby directly driving the inner gimbal support 5 (camera module 103) to generate rotational motion along the Rx axis and the Ry axis for anti-shake of the Rx axis and the Ry axis.

Figure 5:
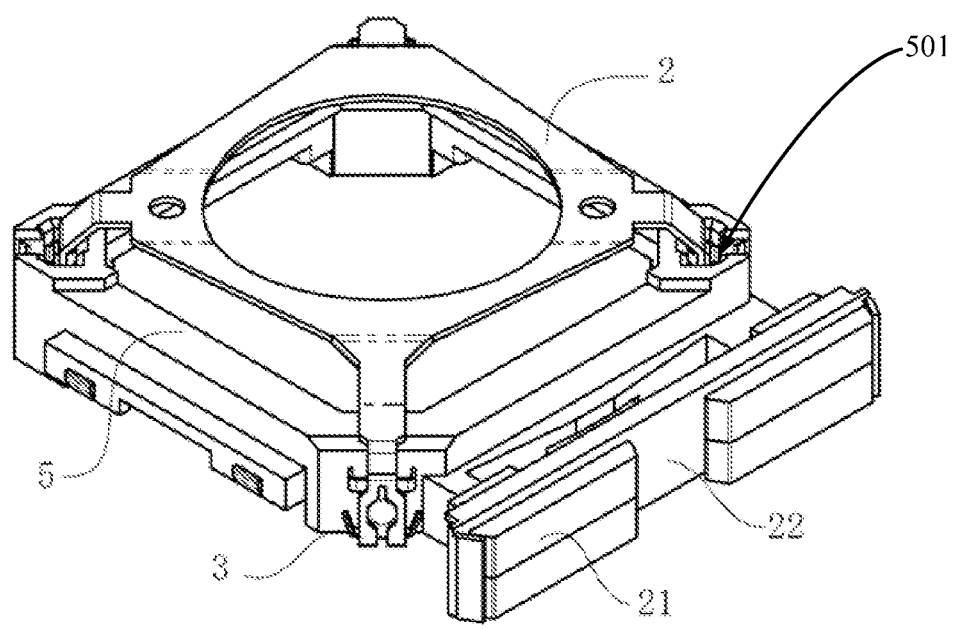
FIG. 5 is a structural diagram of assembly of a universal shaft, an inner gimbal support, an adapter structure, a second magnet yoke, a first magnet group, and a second magnet group.
Figure 6B:
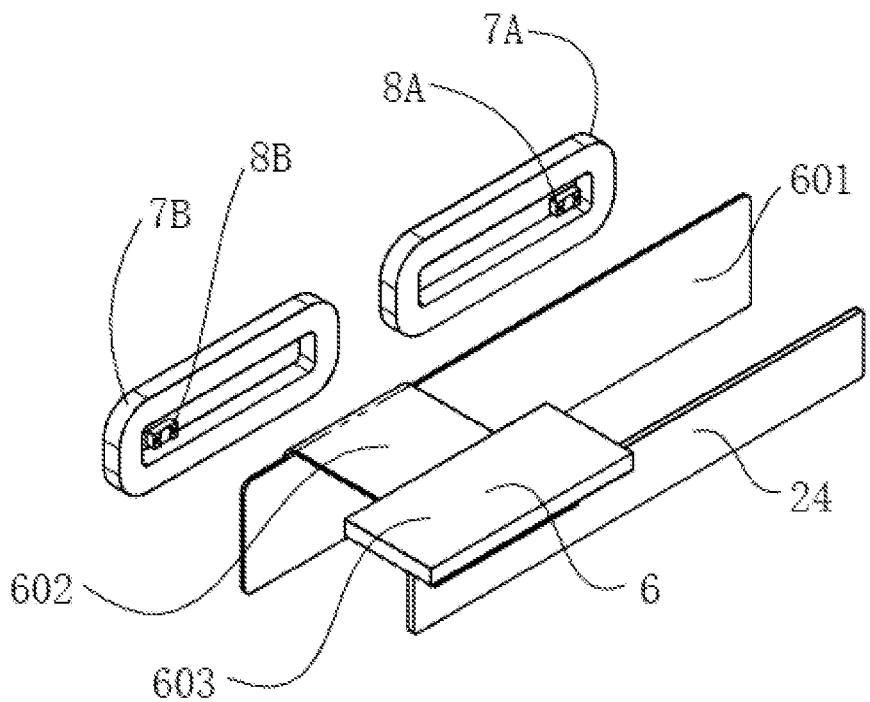
FIG. 6B is a disassembly diagram of a first driving coil group.

For example, as shown in FIG. 5 and FIG. 6B, the first magnet group 21 includes two first magnets (21A and 21B), and the first driving coil group 7 includes two first coils (7A and 7B). Therefore, the first coil 7A is arranged facing the first magnet 21A, and the first coil 7B is arranged opposite to the first magnet 21B. In a case that the force directions of the first magnet 21A and the first magnet 21B are in the same direction as the Z axis or in the same direction as the −Z axis, the magnet drives the inner gimbal support 5 to rotate relative to the outer gimbal support 9 along the Ry direction. When the force directions of the first magnet 21A and the first magnet 21B are different, that is, one is in the same direction as the Z axis and the other is in the same direction as the −Z axis, the inner gimbal support 5 is driven to rotate relative to the outer gimbal support 9 along the Rx axis direction.

In an implementation, the outer gimbal support 9 may be provided with a second through hole 903, so that the coils of the first driving coil group 7 are embedded in the second through hole 903, thereby achieving a fixed connection between the first driving coil group 7 and the outer gimbal support 9.

Figure 7A:
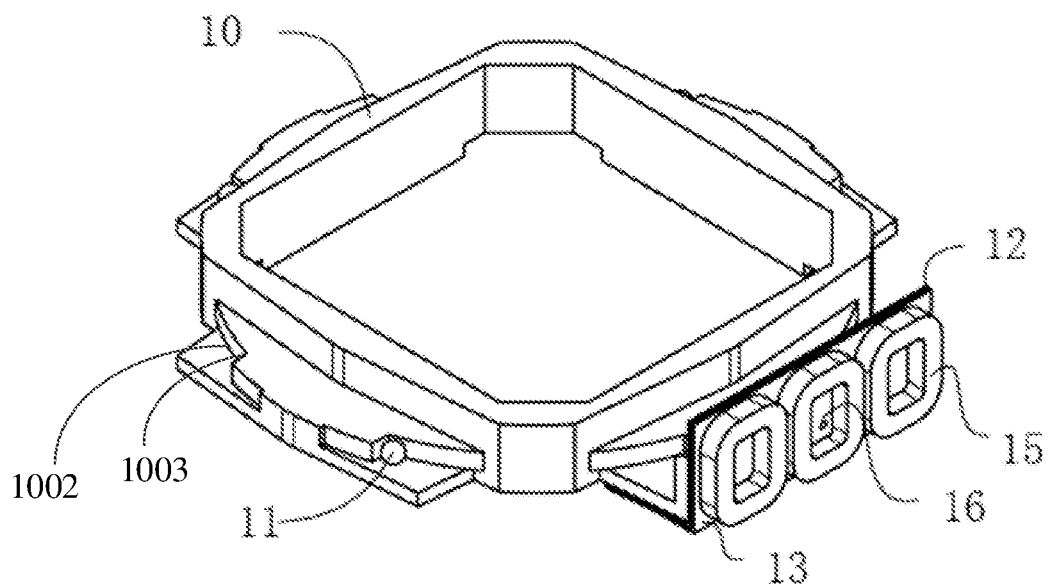
FIG. 7A is a structural diagram of assembly of a gimbal carrier and a second driving coil group.
Figure 7B:
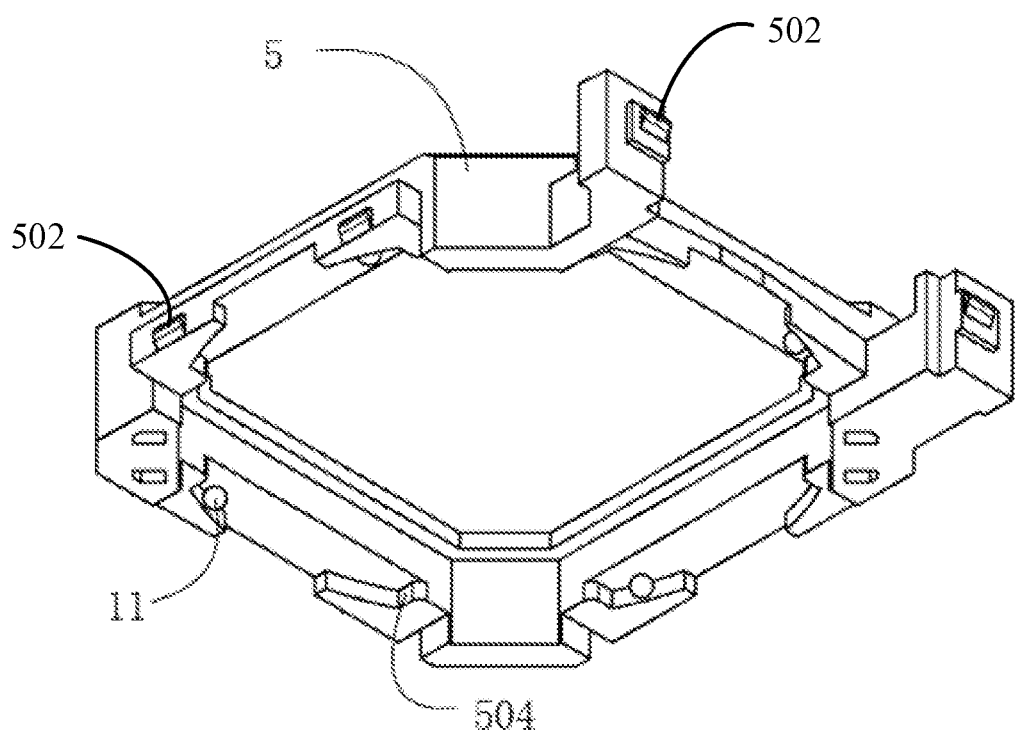
FIG. 7B is a bottom view of an inner gimbal support.
Figure 7C:
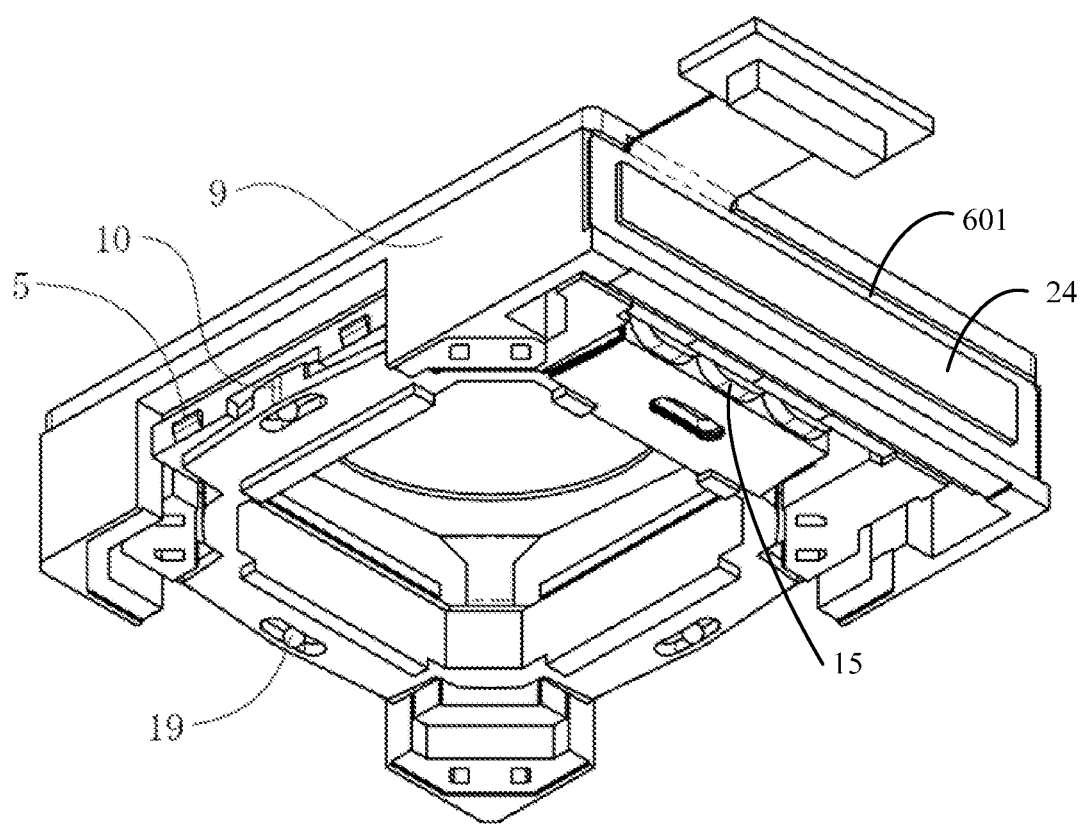
FIG. 7C is a structural diagram of assembly of a gimbal carrier, an inner gimbal support, and an outer gimbal support.
Figure 7D:
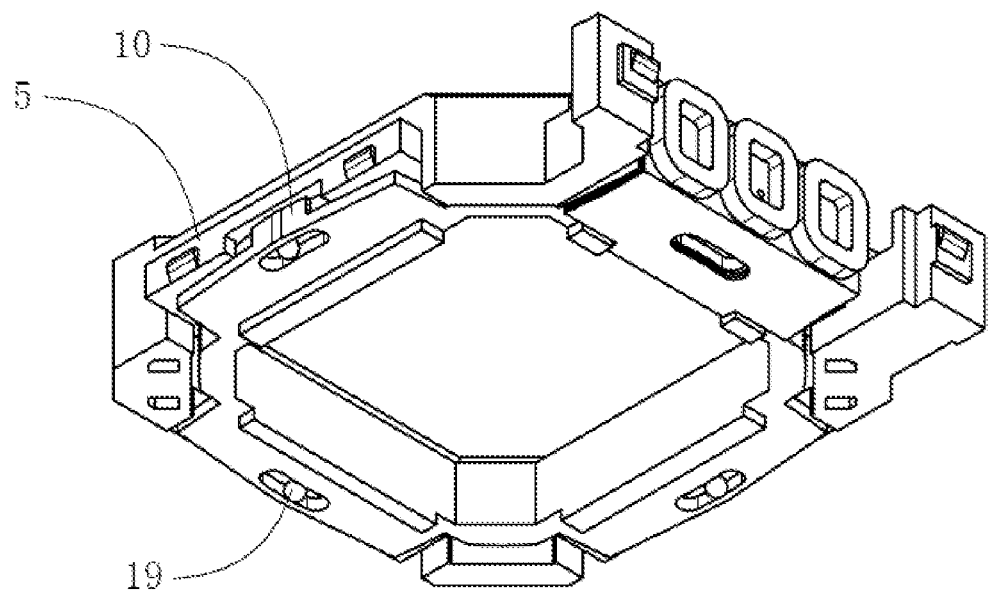
FIG. 7D is a structural diagram of assembly of a gimbal carrier and an inner gimbal support.
Figure 7E:
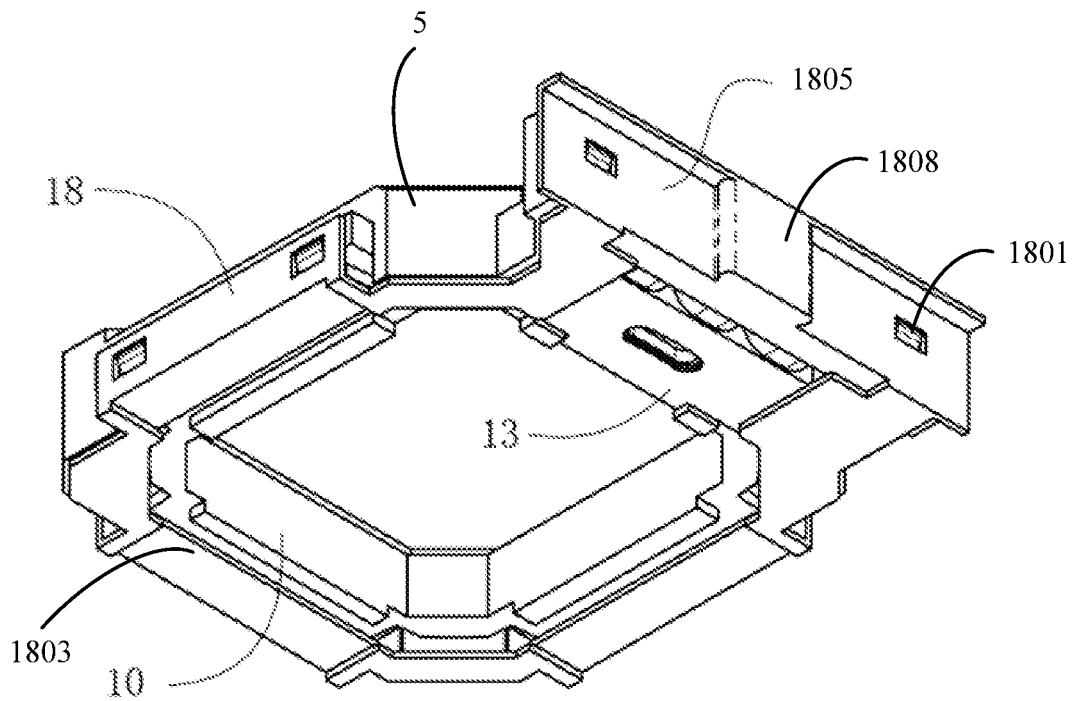
FIG. 7E is a structural diagram of assembly of a gimbal carrier, an inner gimbal support, and a rotating carrier.

In addition, the first magnet yoke 22 is fixed to the first outer side wall of the inner gimbal support 5, where the first magnet yoke 22 may be directly or indirectly fixed to the first outer side wall of the inner gimbal support 5, for example: as shown in FIG. 7E, a rolling supporting bracket 18 fixed to the inner gimbal support 5 may be disposed, so that the first magnet yoke 22 is fixed to the inner gimbal support 5 through the rolling supporting bracket 18.

In an implementation, in order to apply a current with a controllable magnitude and direction to the first driving coil group 7, the first driving coil group 7 may be connected to the first driving circuit board 601. The first driving circuit board 601 may be attached to the outer side of the outer gimbal support 9, and the first driving coil group 7 may be installed on the first driving circuit board 601 through the second through hole 903, to provide the current with a controllable magnitude and direction to the first driving coil group 7 through the first driving circuit board 601.

In an implementation, the magnitude and direction of the current applied into the first driving coil group 7 may be controlled by a controller in the electronic device equipped with a three-axis gimbal provided in the embodiments of this application. In this case, a first interface 603 may also be disposed on the outer side of the first driving circuit board 601 to achieve data communication connection with the controller in the electronic device through the first interface 603. For example, as shown in FIG. 6B, the first interface 603 may be connected to the first driving circuit board 601 through a connection plate 602.

In addition, in a practical application, a first position feedback element group (8A and 8B) can also be disposed on the first driving circuit board 601, so that the rotation amount of the inner gimbal support 5 relative to the outer gimbal support 9 along the Rx axis direction and the Ry axis direction may be detected by the first position feedback element group (8A and 8B), thereby facilitating precise control of the rotation amount.

In an implementation, as shown in FIG. 6B, the first position feedback element group 8 may be a Hall element, and may be disposed within the magnetic field range of the first magnet group 21 and the first driving coil group 7 to determine a displacement amount of the first magnet group 21 relative to the first magnet yoke 22 by inducing changes in the magnetic field, thereby determining the rotation amount of the inner gimbal support 5 relative to the outer gimbal support 9 along the Rx axis and the Ry axis.

Certainly, in an implementation, the first position feedback element group 8 may also be a driving chip. The driving chip can not only control the input of a current with a controllable magnitude and direction to the first driving coil group 7, but also feedback the rotation amount in the Rx axis direction and the Ry axis direction.

In an implementation, the first driving mechanism 101 further includes: an outer magnet yoke 24, where the outer magnet yoke 24 is fixed to the outer gimbal support 9, and forms a magnetic circuit with the first magnet group 21.

In an implementation, as shown in FIG. 6B, the outer magnet yoke 24 may be fixed on an outer side of the first driving circuit board 601.

A function of the outer magnet yoke 24 is to increase the driving force of the first driving mechanism 101, in order to improve the anti-shake effect of the camera structure provided in the embodiments of this application along the Rx axis and the Ry axis.

In an implementation, the second driving mechanism 102 includes: a second magnet yoke (in this implementation, the second magnet yoke and the first magnet yoke is the same magnet yoke 22), a second driving coil group 15, and a second magnet group 17, where the second driving coil group 15 is fixed to the gimbal carrier 10, the second magnet yoke 22 is fixed to the first outer side wall of the inner gimbal support 5, the second magnet group 17 is fixed to the second magnet yoke 22, and the second magnet group 17 matches with the second driving coil group 15; and at least two coils of the second driving coil group 15 are arranged at interval along a first direction, the first direction is perpendicular to the third axis, the second driving coil group is distributed on two opposite sides of a symmetry axis of the gimbal carrier 10, and the symmetry axis is in a same direction as a direction from the first outer side wall of the inner gimbal support 5 to the first inner side wall of the outer gimbal support 9, where in a case that the second driving coil group 15 is energized with current, an interaction force is generated between the second driving coil group 15 and the second magnet group 17, and the second magnet group 17 drives, based on the interaction force, the gimbal carrier 10 to rotate relative to the inner gimbal support 5 along the third axis.

It should be noted that in the embodiments of this application, the first magnet yoke and the second magnet yoke are the same magnet yoke 22, and the first magnet group 21 and the second magnet group 17 are fixed on opposite two sides of the magnet yoke 22 respectively, which can reduce a quantity of magnet yokes in the camera structure provided in the embodiments of this application, reduce its volume, and reduce costs. Certainly, if space and cost allow, the first magnet yoke and the second magnet yoke may be different magnet yokes, which is not limited herein.

In an implementation, as shown in FIG. 7B, the first magnet yoke 22 may be provided with a through hole, to engage a buckle structure 502 extending from the first outer side wall of the inner gimbal support 5 with the through hole. In addition, the gimbal carrier 10 is movably connected to the bottom portion of the inner gimbal support 5, so that the second driving coil group 15 fixed to the gimbal carrier 10 is located between the first outer side wall of the inner gimbal support 5 and the first magnet yoke 22. Therefore, when the second driving coil group 15 is energized with a current with a controlled magnitude and direction, an interaction force may be generated between the second driving coil group 15 and the second magnet group 17 that is fixed on one side of the first magnet yoke 22 and faces towards the second driving coil group 15, thereby driving the gimbal carrier 10 relative to the inner gimbal support 5 along the third axis based on the second magnet group 17.

In an implementation, in order to apply a current with a controllable magnitude and direction to the second driving coil group 15, the second driving coil group 15 may be connected to a second driving circuit board 13. The second driving circuit board may be attached to the outer side wall of the gimbal carrier 10, the second driving coil group 15 may be installed on the second driving circuit board 13, and a second driving chip 16 connected to the second driving coil group 15 may be disposed on the second driving circuit board 13, to control the magnitude and direction of the current input to the second driving coil group 15 through the second driving chip 16.

In addition, in a practical application, a second position feedback element group may also be disposed on the second driving circuit board 13 (in this embodiment, the second position feedback element group and the second driving chip 16 are the same component) to obtain the rotation amount of the gimbal carrier 10 relative to the inner gimbal support 5 along the third axis through the second driving chip 16, thereby facilitating precise control of the Rz axis rotation amount.

Certainly, in an implementation, the second position feedback element group may also be different components from the second driving chip 16, for example, the second position feedback element group includes a Hall element, and may be disposed within the magnetic field range of the second driving coil group 15 and the second magnet group 17 to determine the displacement amount of the second driving coil group 15 relative to the second magnet yoke 22 by inducing changes in the magnetic field, thereby determining the rotation amount of the gimbal carrier 10 relative to the inner gimbal support 5 along the Rz axis direction.

In addition, in an implementation, the first position feedback element group 8 may also be a driving chip. The driving chip can not only control the input of a current with a controllable magnitude and direction to the second driving coil group 15, but also feedback the rotation amount in the Rx axis direction and the Ry axis direction.

In an implementation, as shown in FIG. 7A, the second driving circuit board 13 may be in a bent structure to be attached to the adjacent two side walls of the gimbal carrier 10 (for example: the first outer side wall and a bottom wall shown in FIG. 7A). In addition, a circuit board stiffener 12 that matches the structure of the second driving circuit board 13 may also be disposed to enhance the structural strength of the second driving circuit board 13 by attaching the second driving circuit board 13 to the circuit board stiffener 12.

In an implementation, the second driving mechanism 102 further includes: an inner magnet yoke (not shown in the figure), where the inner magnet yoke is fixed to the gimbal carrier 10, and forms a magnetic circuit with the second magnet group 17.

In an implementation, the inner magnet yoke may be fixed on a side of the second driving circuit board 13 that faces away from the second driving coil group 15, for example: As shown in FIG. 7A, a groove 1004 is disposed on the outer side wall of the gimbal carrier 10 to embed the inner magnet yoke in the groove 1004 and clamp the inner magnet yoke between the gimbal carrier 10 and the second driving circuit board 13.

A function of the inner magnet yoke 4 is to increase the driving force of the second driving mechanism 102, in order to improve the anti-shake effect of the camera structure provided in the embodiments of this application along the Rz axis direction.

Figure 4A:
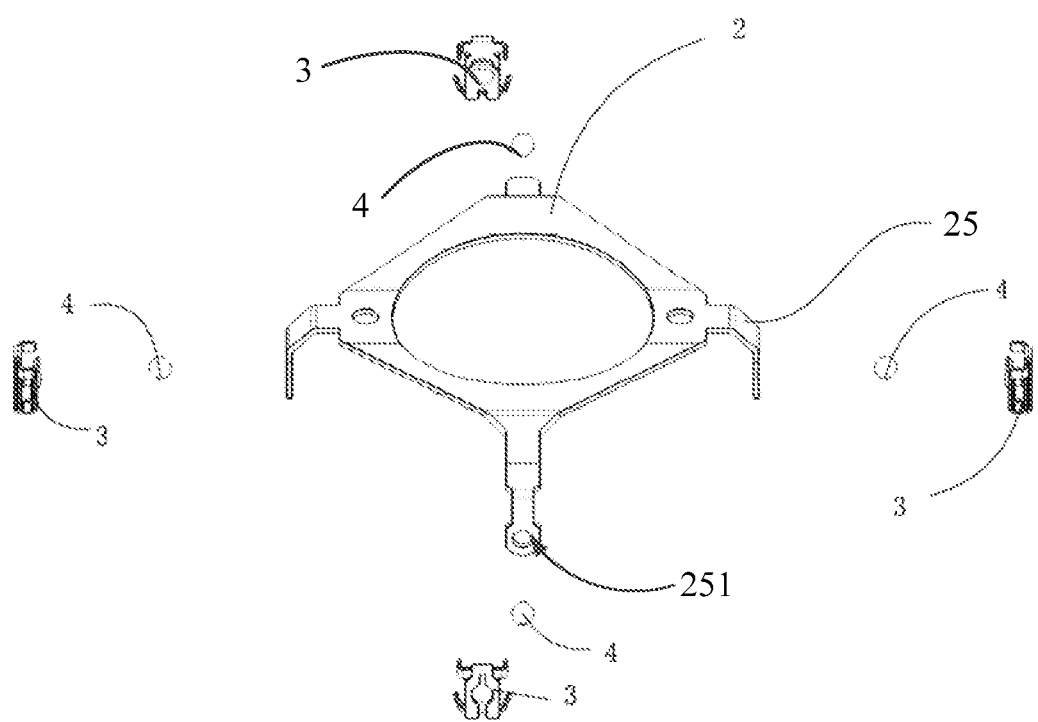
FIG. 4A is a structural diagram of a universal shaft.
Figure 4B:
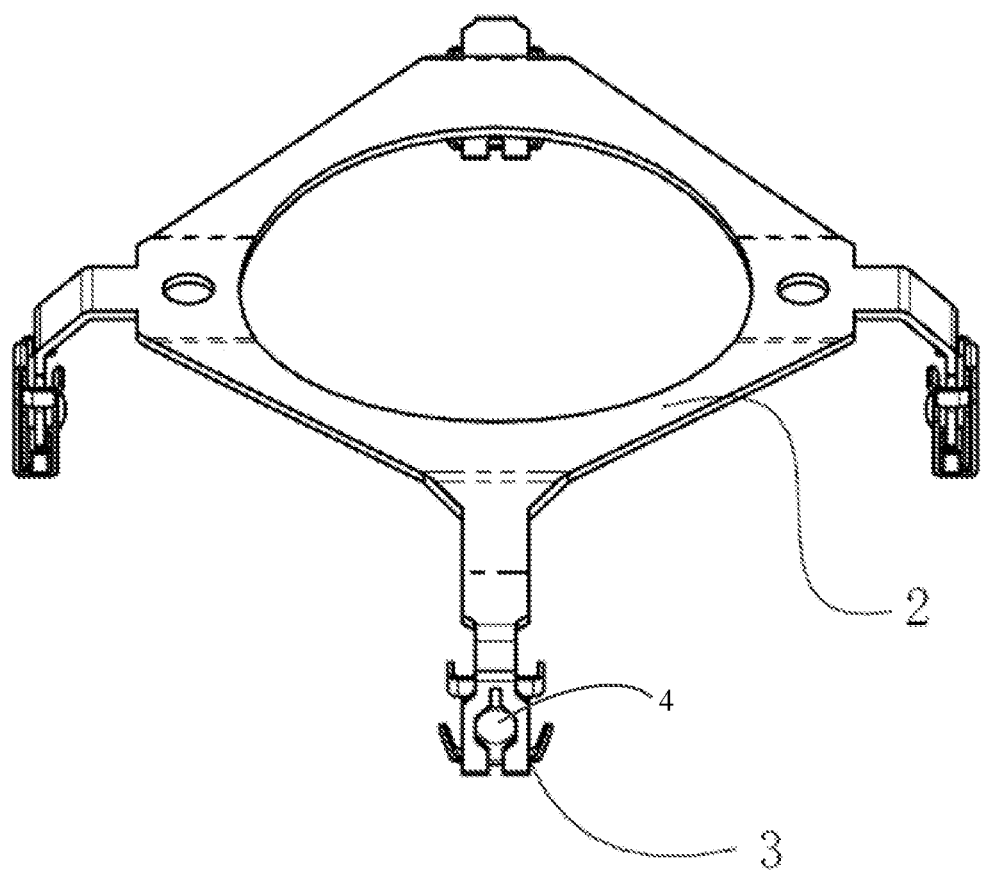
FIG. 4B is a structural diagram of assembly of a universal shaft and an adapter structure.

In an implementation, as shown in FIG. 4A and FIG. 4B, each of the supporting portions 25 is provided with a first through hole 251, and an axial direction of the first through hole 251 is perpendicular to the third axis; and the camera structure further includes: an adapter structure, where the adapter structure includes a clamping portion 3 (for example, a U-shaped arm) and a first ball 4, wherein the first ball 4 is disposed inside the first through hole 251 and is clamped between two side walls of the clamping portion 3; and the clamping portion 3 is configured to be fixedly connected to the outer gimbal support 9 or the inner gimbal support 5.

As shown in FIG. 4A, four corners of the universal shaft 2 extend along an opposite direction of the Z axis to connect to an adapter structure. During the assembly process, the first ball 4 may be clamped in the first through hole 251, and then inserted into the clamping portion 3 together.

Figure 4C:
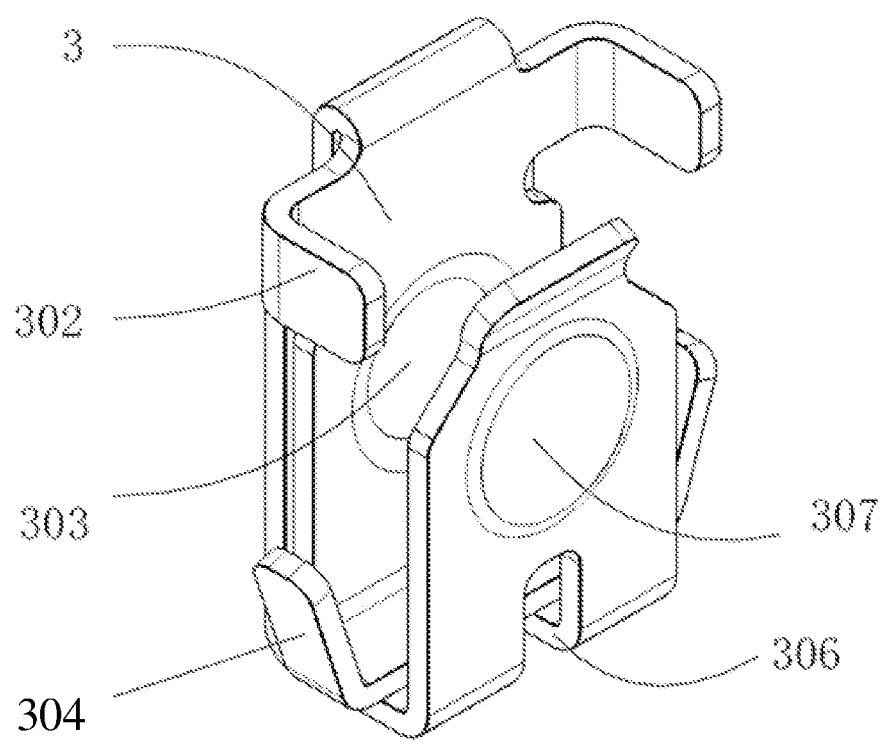
FIG. 4C is a side view of an adapter structure.

In addition, as shown in FIG. 4C, the opposite two side walls of the clamping portion 3 may be recessed in a direction away from each other, so that when the first ball 4 is clamped in the clamping portion 3, the first ball 4 can maintain the position unchanged in the clamping portion 3. For example, a ball maintaining structure 303 and a ball maintaining structure 307 are respectively disposed on the opposite two side walls of the clamping portion 3, where the ball maintaining structure 307 is located on the opposite side of the ball maintaining structure 303, and the ball maintaining structure 303 is elastically connected to the side wall on which the ball maintaining structure 307 is located to facilitate the assembly of the first ball 4 and the supporting portion 25. The bottom portion of the clamping portion 3 is provided with an opening 306 to reduce the elastic force between the opposite two side walls of the clamping portion 3.

Figure 4D:
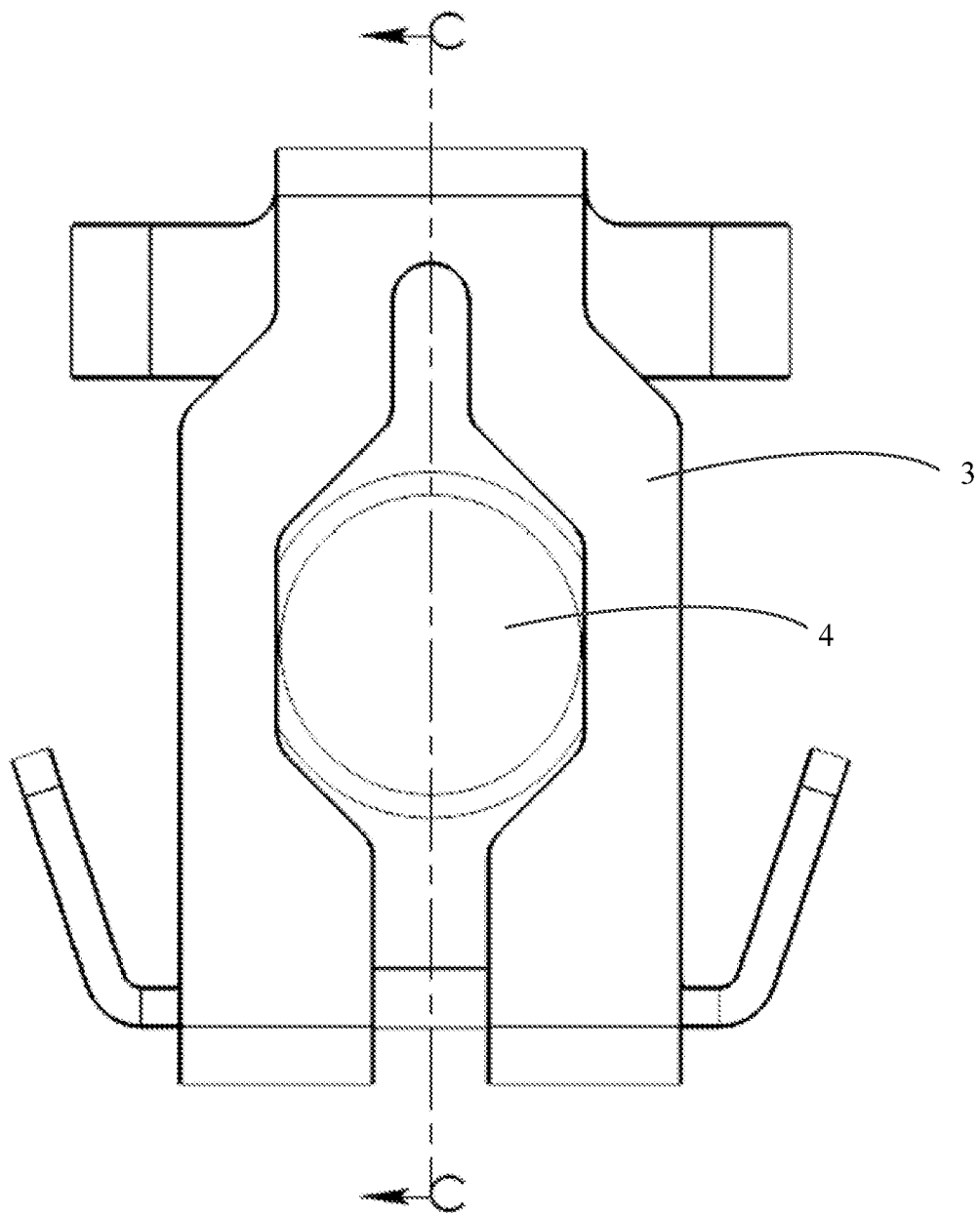
FIG. 4D is a main view of an adapter structure.
Figure 4E:
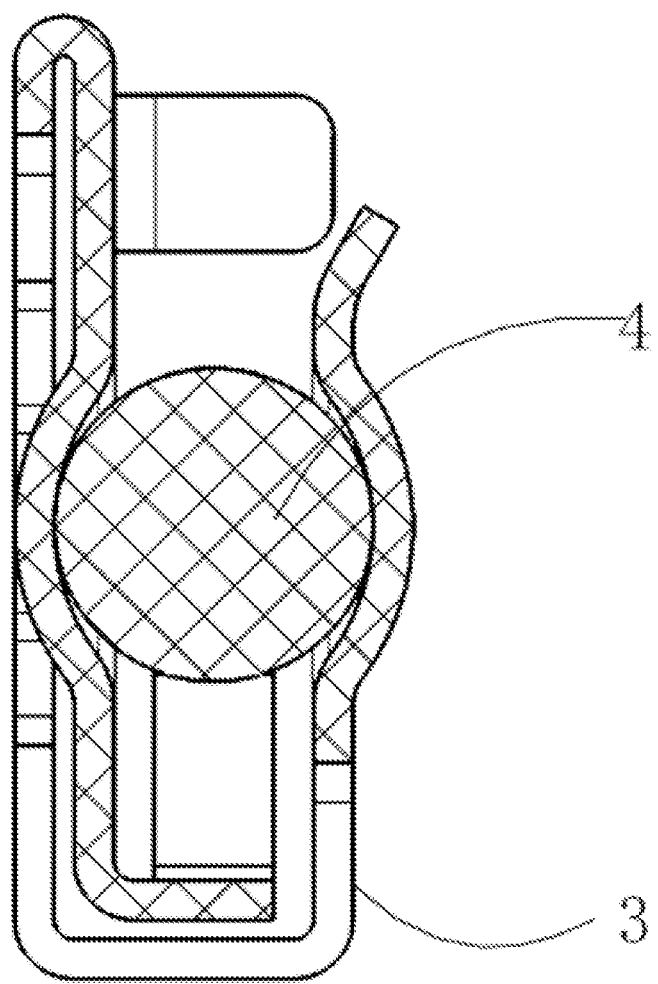
FIG. 4E is a cross-sectional view along a C-C direction in FIG. 4D.

In an implementation, as shown in FIG. 4C, FIG. 4D, and FIG. 4E, the adapter structure further includes: a guide plate 302, where the guide plate 302 is fixedly connected to a first side wall of the clamping portion 3 and extends towards a direction of a second side wall of the clamping portion 3, and the first side wall of the clamping portion 3 and the second side wall of the clamping portion 3 are opposite two side walls of the clamping portion 3;

and/or the adapter structure further includes: a limiting plate 304, where the limiting plate 304 is fixed on an end of the clamping portion 3 that is away from the universal shaft 2 (for example, a groove bottom portion of the U-shaped arm) to limit a rotation angle of the supporting portion 25 to be less than a preset angle in a case that the supporting portion 25 is rotated relative to the clamping portion 3.

In an implementation, the first side wall of the clamping portion 3 may be located on the side of the clamping portion 3 that is away from the center of the universal shaft 2, and a quantity of guide plates 302 is two. The two guide plates 302 are located on opposite two sides of the first side wall of the clamping portion 3 to align the supporting portion 25 with the center of the two guide plates 302 during assembly, thereby playing a guiding role.

In addition, an end of the limiting plate 304 that is not fixed to the clamping portion 3 can be tilted outward, so that in a case that the supporting portion 25 is rotated by a preset angle around the first ball 4, the supporting portion 25 abuts against the limiting plate 304, thereby preventing rotation of the supporting portion 25.

In an implementation, as shown in FIG. 5 and FIG. 6A, clamping grooves (501, 901) are disposed on the outer gimbal support 9 and the inner gimbal support 5 that match the clamping portion 3. The clamping portion 3 is clamped in the clamping grooves (501, 901) to hinge the supporting portion 25 to the outer gimbal support 9 or the inner gimbal support 5.

For example, the two supporting portions 25 located on the first axis direction of the universal shaft 2 are respectively clamped in two clamping grooves 901 on the diagonal of the outer gimbal support 9, and the two supporting portions 25 located on the second axis direction of the universal shaft 2 are respectively clamped in two clamping grooves 501 on the diagonal of the inner gimbal support 5.

In this embodiment, clamping grooves (501, 901) are provided on the outer gimbal support 9 and the inner gimbal support 5, so that heights of the universal shaft 2, the outer gimbal support 9, and the inner gimbal support 5 along the Z axis direction can be reduced, thereby reducing the overall size of the camera structure provided in the embodiments of this application.

Figure 8A:
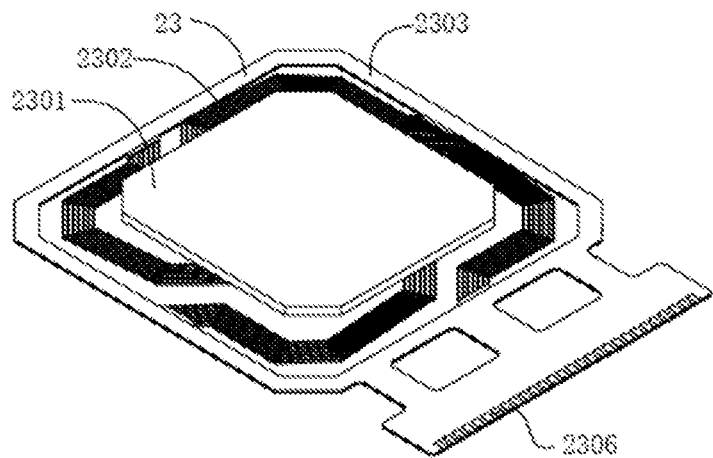
FIG. 8A is a structural diagram of a flexible circuit board.
Figure 8B:
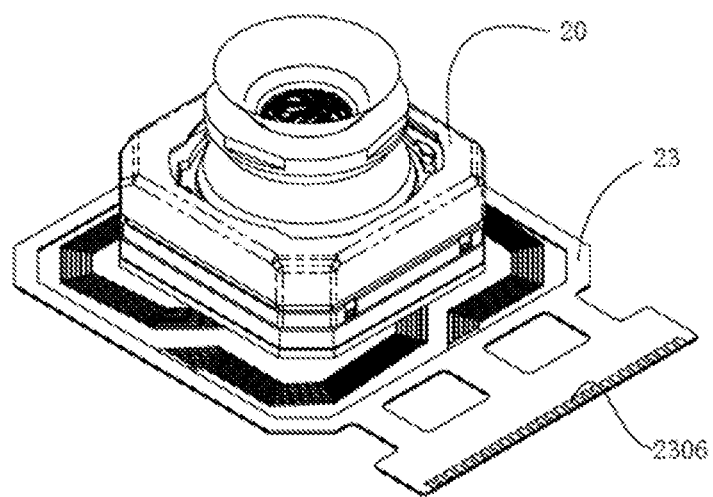
FIG. 8B is a structural diagram of assembly of a flexible circuit board and a camera component.

In an implementation, as shown in FIG. 8B, the camera module 103 includes a camera component 20 and a first circuit board 23, where
the camera component 20 is fixed to the gimbal carrier 10, the first circuit board 23 is fixed on a side of the camera component 20 that is away from the gimbal carrier 10, and the first circuit board 23 is movably connected to the outer gimbal support 9.

In an implementation, the first circuit board 23 can transmit a data signal and an electrical signal of the camera component 20, the first circuit board 23 is fixed on a side of the camera component 20 that is away from the gimbal carrier 10, and the first circuit board 23 is movably connected to the outer gimbal support 9, so that the first circuit board 23 can rotate with the gimbal carrier 10 together.

In an implementation, as shown in FIG. 8A, the first circuit board 23 includes: a first sub-circuit board 2301, a second sub-circuit board 2303, and a flexible circuit 2302, where
the second sub-circuit board 2303 surrounds the first sub-circuit board 2301, and the first sub-circuit board 2301 and the second sub-circuit board 2303 are located in a same plane; and
the first sub-circuit board 2301 is movably connected to the second sub-circuit board 2303 through the flexible circuit 2302.

In an implementation, the flexible circuit 2302 can form a planar spring structure to enable relative movement of the first sub-circuit board 2301 and the second sub-circuit board 2303.

In addition, the second sub-circuit board 2303 can also be provided with an interface or a pad 2306 for connecting to a connector, and the second sub-circuit board 2303 extends from a bottom opening of the shell 1 to the outside of the shell 1, so that the pad 2306 is located outside the shell 1, so as to facilitate the connection of the first circuit board 23 with the internal circuit of the electronic device equipped with the camera structure provided in the embodiments of this application through the pad 2306.

In this implementation, by connecting the flexible circuit 2302 between the first sub-circuit board 2301 and the second sub-circuit board 2303 located in the same plane, and making the flexible circuit 2302 form a planar spring structure, elastic connection between the first sub-circuit board 2301 and the second sub-circuit board 2303 can be achieved, thereby reducing the occupied space of the first circuit board 23 and achieving elastic connection between the camera component 20 and the outer gimbal support 9 through the first circuit board 23, in order to maintain the attitude of the camera component 20.

In an implementation, as shown in FIG. 7A and FIG. 7B, at least two first curved baffles 504 are disposed on the bottom portion of the inner gimbal support 5, and a ring at which the at least two first curved baffles 504 are located is coaxial with the third axis; and
at least two second curved baffles 1002 that are in a one-to-one correspondence with the at least two first curved baffles 504 are disposed on the gimbal carrier 10, and one first curved baffle 504 and one second curved baffle 1002 form a curved baffle group; and
the camera structure further includes: a second ball 11, where
one second ball 11 is clamped in one curved baffle group.

Under the limit action of the curved baffle group, the second ball 11 can only rotate around the Z axis, so that when the gimbal carrier is under stress, the gimbal carrier can only rotate around the Z axis, thereby improving the accuracy of anti-shake along the Rz axis direction.

In an implementation, an end of the second curved baffle 1002 can be provided with a rotation limit portion 1003 to limit the rotation of the gimbal carrier 10 relative to the inner gimbal support 5 along the Rz axis direction.

Certainly, in an implementation, it is also possible to limit the rotation of the gimbal carrier 10 relative to the inner gimbal support 5 around the Z axis by setting a slide rail and a slider between the inner gimbal support 5 and the gimbal carrier 10, which is not described here.

In an implementation, as shown in FIG. 7C, the camera structure further includes: a rolling supporting bracket 18, where
the rolling supporting bracket 18 is fixed to the inner gimbal support 5 and abuts against a side of the gimbal carrier 10 that faces away from the inner gimbal support 5 to limit movement of the gimbal carrier 10 along a direction of the third axis.

In this embodiment, the gimbal carrier 10 is clamped between the rolling supporting bracket 18 and the inner gimbal support 5 to limit the axial movement of the camera module 103 along the Z axis driven by the inner gimbal support 5, thereby improving the accuracy of the camera structure.

In an implementation, as shown in FIG. 7D, a groove or through hole can be provided on the bottom surface of the gimbal carrier 10 that is attached to the rolling supporting bracket 18, and the second ball 19 can be clamped in the groove or the through hole to reduce the friction between the rolling supporting bracket 18 and the gimbal carrier 10, thereby improving the sensitivity of the second driving mechanism 102 to drive the gimbal carrier 10.

For example, as shown in FIG. 7E, the rolling supporting bracket 18 is an integrated structure, which includes: a buckle structure 1801 configured to buckle with the inner gimbal support 5, a platform 1803 configured to support the second ball 19, and an installation plate 1805 configured to fix the first magnet yoke 22. The installation plate 1805 is provided with a third through hole to ensure that the buckle structure on the inner gimbal support 5 passes through the third through hole and is fixedly connected to the installation plate 1805 and the first magnet yoke 22.

The first magnet yoke 22 can be fixed to the inner gimbal support 5 by clamping between the inner gimbal support 5 and the installation plate 1805, and the installation plate 1805 is provided with a spacing portion 1808 protruding towards the direction away from the gimbal carrier 10. The spacing portion 1808 separates the installation plate 1805 into two parts, so that when the first magnet group 21 is installed on one side of the installation plate 1805 facing away from the gimbal carrier 10, by separating the magnets of the first magnet group 21 through the spacing portion 1808 and limiting the magnets in the first magnet group 21, the fixed strength of the magnets in the first magnet group 21 can be improved.

Based on the above, the camera structure provided in the embodiments of this application has the following beneficial effects: the camera structure can drive the camera module to rotate in the Rx direction, the Ry direction, and the Rz direction. In addition to preventing shake in the Rx direction, the Ry direction, and the Rz direction, the camera structure can also be combined with corresponding algorithm processing to achieve translation shake along the X axis and the Y axis. Therefore, the camera structure can have a total of anti-shake effect along the 5 axis direction; the electromagnetic driving module (the first driving mechanism and the second driving mechanism) is disposed on a side of the camera structure, which leaves more non-magnetic areas on the other three sides of the camera structure, facilitating the layout of the multi axis anti-shake mechanism; a planar spring circuit board structure is adopted, so that the circuit board is unfolded in a planar manner in the bottom space of the gimbal, without the need for multiple bends of the circuit board. In this way, the occupied space of the circuit board is reduced, the overall volume of the camera structure is reduced, and more space is allowed for layout of other devices, such as increasing battery size and capacity to improve the battery life of a mobile phone, and indirectly improving the use experience of a consumer; a gimbal carrier structure and a driving structure thereof that can rotate in the Rz direction are disposed in the middle of the camera structure; and movement of the gimbal carrier structure and the driving structure thereof is independent of the movement along Rx and Ry, which can effectively reduce a crosstalk impact of three-axis synchronous drive; and the gimbal carrier 10 is provided with the second driving coil group 15 and the driving element, which can be led out through the first circuit board 23 to connect to an external circuit. The first driving coil group 7 and the first position feedback element group 8 are disposed on a side of the camera structure and fixed on the outer gimbal support 9, which can be directly led out to connect to the external circuit. A clamping portion supporting structure with double-sided clamping of the first ball 4 can reduce the impact of multi degree of freedom vibration, thereby reducing changes in camera external parameters and providing strong support for multi camera fusion algorithms.

An embodiment of this application further provides an electronic device, and the electronic device includes any camera structure shown in FIG. 1 to FIG. 8B.

The electronic device in the embodiments of this application may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA), and the non-mobile electronic device may be a personal computer (PC), a television (TV), a teller machine, or an automated machine, which are not limited in the embodiments of this application.

The electronic device provided in embodiments of this application includes any camera structure shown in FIG. 1 to FIG. 8B, and has the same beneficial effect as any camera structure shown in FIG. 1 to FIG. 8B. To avoid repetition, it will not be repeated here.

The embodiments of this application are described above with reference to the accompanying drawings, but this application is not limited to the foregoing embodiments, which are merely illustrative rather than limited. Under the inspiration of this application, a person of ordinary skill in the art may make various variations without departing from the scope of this application and the protection of the claims, and such variations shall fall within the protection of this application.

What is claimed is:

1. A camera structure, comprising: a universal shaft, an outer gimbal support, an inner gimbal support accommodated in the outer gimbal support, a gimbal carrier, a first driving mechanism, a second driving mechanism, and a camera module; wherein
   the camera module is movably connected to the outer gimbal support, and the camera module is fixedly connected to the gimbal carrier;
   two supporting portions of the universal shaft that are axially distributed along a first axis are hinged to the outer gimbal support, and two supporting portions of the universal shaft that are axially distributed along a second axis are hinged to the inner gimbal support, wherein the first axis intersects with the second axis;
   the first driving mechanism is connected to the outer gimbal support and the inner gimbal support, to drive the inner gimbal support to rotate relative to the outer gimbal support along the first axis and/or the second axis;
   the gimbal carrier is slidably connected to a bottom portion of the inner gimbal support; and
   the second driving mechanism is connected to the inner gimbal support and the gimbal carrier, to drive the gimbal carrier to rotate relative to the inner gimbal support along a third axis, wherein the third axis is perpendicular to the first axis and the second axis.

2. The camera structure according to claim 1, wherein there is a first accommodating space between a first inner side wall of the outer gimbal support and a first outer side wall of the inner gimbal support, and the first driving mechanism and the second driving mechanism are disposed in the first accommodating space.

3. The camera structure according to claim 2, wherein the first driving mechanism comprises: a first magnet yoke, a first driving coil group, and a first magnet group; wherein
   the first driving coil group is fixed to the outer gimbal support, the first magnet yoke is fixed to the first outer side wall of the inner gimbal support, the first magnet group is fixed to the first magnet yoke, and the first magnet group matches with the first driving coil group; and
   at least two coils of the first driving coil group are arranged at interval along a first direction, the first direction is perpendicular to the third axis, the first driving coil group is distributed on two opposite sides of a symmetry axis of the inner gimbal support, and the symmetry axis is in a same direction as a direction from the first outer side wall of the inner gimbal support to the first inner side wall of the outer gimbal support; wherein
   in a case that the first driving coil group is energized with current, an interaction force is generated between the first driving coil group and the first magnet group, and the first magnet group is configured to drive, based on the interaction force, the inner gimbal support to rotate relative to the outer gimbal support along the first axis and/or along the second axis.

4. The camera structure according to claim 3, further comprising:
a first position feedback element group, configured to detect a rotation amount of the inner gimbal support relative to the outer gimbal support along the first axis or the second axis, wherein the first position feedback element group is disposed within a magnetic field range of the first magnet group and the first driving coil group.

5. The camera structure according to claim 3, wherein the first driving mechanism further comprises: an outer magnet yoke; wherein
the outer magnet yoke is fixed to the outer gimbal support, and is configured to form a magnetic circuit with the first magnet group.

6. The camera structure according to claim 2, wherein the second driving mechanism comprises: a second magnet yoke, a second driving coil group, and a second magnet group; wherein
the second driving coil group is fixed to the gimbal carrier, the second magnet yoke is fixed to the first outer side wall of the inner gimbal support, the second magnet group is fixed to the second magnet yoke, and the second magnet group matches with the second driving coil group; and
at least two coils of the second driving coil group are arranged at interval along a first direction, the first direction is perpendicular to the third axis, the second driving coil group is distributed on two opposite sides of a symmetry axis of the gimbal carrier, and the symmetry axis is in a same direction as a direction from the first outer side wall of the inner gimbal support to the first inner side wall of the outer gimbal support; wherein
in a case that the second driving coil group is energized with current, an interaction force is generated between the second driving coil group and the second magnet group, and the second magnet group is configured to drive, based on the interaction force, the gimbal carrier to rotate relative to the inner gimbal support along the third axis.

7. The camera structure according to claim 6, further comprising:
a second position feedback element group, configured to detect a rotation amount of the gimbal carrier relative to the inner gimbal support along the third axis, wherein the second position feedback element group is disposed within a magnetic field range of the second magnet group and the second driving coil group.

8. The camera structure according to claim 1, wherein each of the supporting portions is provided with a first through hole, and an axial direction of the first through hole is perpendicular to the third axis; and
the camera structure further comprises: an adapter structure, wherein the adapter structure comprises a clamping portion and a first ball; wherein
the first ball is disposed inside the first through hole and is clamped between two side walls of the clamping portion; and
the clamping portion is configured to be fixedly connected to the outer gimbal support or the inner gimbal support.

9. The camera structure according to claim 8, wherein the adapter structure further comprises: a guide plate, wherein the guide plate is fixedly connected to a first side wall of the clamping portion and extends towards a direction of a second side wall of the clamping portion, and the first side wall of the clamping portion and the second side wall of the clamping portion are opposite two side walls of the clamping portion; and/or
the adapter structure further comprises: a limiting plate, wherein the limiting plate is fixed at an end of the clamping portion that is away from the universal shaft, to limit a rotation angle of the supporting portion to be less than a preset angle in a case that the supporting portion is rotated relative to the clamping portion.

10. The camera structure according to claim 8, wherein the outer gimbal support and the inner gimbal support are provided with clamping grooves that matches the clamping portion, and the clamping portion is clamped in the clamping grooves to hinge the supporting portion to the outer gimbal support or the inner gimbal support.

11. The camera structure according to claim 1, wherein the camera module comprises a camera component and a first circuit board; wherein
the camera component is fixed to the gimbal carrier; and
the first circuit board is fixed on a side of the camera component that is away from the gimbal carrier, and the first circuit board is movably connected to the outer gimbal support.

12. The camera structure according to claim 11, wherein the first circuit board comprises: a first sub-circuit board, a second sub-circuit board, and a flexible circuit; wherein
the second sub-circuit board surrounds the first sub-circuit board, and the first sub-circuit board and the second sub-circuit board are located in a same plane; and
the first sub-circuit board is movably connected to the second sub-circuit board through the flexible circuit.

13. The camera structure according to claim 1, wherein at least two first curved baffles are disposed on the bottom portion of the inner gimbal support, and a ring at which the at least two first curved baffles are located is coaxial with the third axis; and
at least two second curved baffles that are in a one-to-one correspondence with the at least two first curved baffles are disposed on the gimbal carrier, and one first curved baffle and one second curved baffle form a curved baffle group; and
the camera structure further comprises: a second ball, wherein
one second ball is clamped in one curved baffle group.

14. The camera structure according to claim 13, further comprising: a rolling supporting bracket; wherein
the rolling supporting bracket is fixed to the inner gimbal support and abuts against a side of the gimbal carrier that faces away from the inner gimbal support, to limit movement of the gimbal carrier along a direction of the third axis.

15. An electronic device, comprising a camera structure, wherein the camera structure comprises: a universal shaft, an outer gimbal support, an inner gimbal support accommodated in the outer gimbal support, a gimbal carrier, a first driving mechanism, a second driving mechanism, and a camera module; wherein
the camera module is movably connected to the outer gimbal support, and the camera module is fixedly connected to the gimbal carrier;
two supporting portions of the universal shaft that are axially distributed along a first axis are hinged to the outer gimbal support, and two supporting portions of the universal shaft that are axially distributed along a second axis are hinged to the inner gimbal support, wherein the first axis intersects with the second axis;

the first driving mechanism is connected to the outer gimbal support and the inner gimbal support, to drive the inner gimbal support to rotate relative to the outer gimbal support along the first axis and/or the second axis;

the gimbal carrier is slidably connected to a bottom portion of the inner gimbal support; and the second driving mechanism is connected to the inner gimbal support and the gimbal carrier, to drive the gimbal carrier to rotate relative to the inner gimbal support along a third axis, wherein the third axis is perpendicular to the first axis and the second axis.

16. The electronic device according to claim 15, wherein there is a first accommodating space between a first inner side wall of the outer gimbal support and a first outer side wall of the inner gimbal support, and the first driving mechanism and the second driving mechanism are disposed in the first accommodating space.

17. The electronic device according to claim 16, wherein the first driving mechanism comprises: a first magnet yoke, a first driving coil group, and a first magnet group; wherein the first driving coil group is fixed to the outer gimbal support, the first magnet yoke is fixed to the first outer side wall of the inner gimbal support, the first magnet group is fixed to the first magnet yoke, and the first magnet group matches with the first driving coil group; and at least two coils of the first driving coil group are arranged at interval along a first direction, the first direction is perpendicular to the third axis, the first driving coil group is distributed on two opposite sides of a symmetry axis of the inner gimbal support, and the symmetry axis is in a same direction as a direction from the first outer side wall of the inner gimbal support to the first inner side wall of the outer gimbal support; wherein in a case that the first driving coil group is energized with current, an interaction force is generated between the first driving coil group and the first magnet group, and the first magnet group is configured to drive, based on the interaction force, the inner gimbal support to rotate relative to the outer gimbal support along the first axis and/or along the second axis.

18. The electronic device according to claim 17, further comprising:

a first position feedback element group, configured to detect a rotation amount of the inner gimbal support relative to the outer gimbal support along the first axis or the second axis, wherein the first position feedback element group is disposed within a magnetic field range of the first magnet group and the first driving coil group.

19. The electronic device according to claim 16, wherein the second driving mechanism comprises: a second magnet yoke, a second driving coil group, and a second magnet group; wherein the second driving coil group is fixed to the gimbal carrier, the second magnet yoke is fixed to the first outer side wall of the inner gimbal support, the second magnet group is fixed to the second magnet yoke, and the second magnet group matches with the second driving coil group; and at least two coils of the second driving coil group are arranged at interval along a first direction, the first direction is perpendicular to the third axis, the second driving coil group is distributed on two opposite sides of a symmetry axis of the gimbal carrier, and the symmetry axis is in a same direction as a direction from the first outer side wall of the inner gimbal support to the first inner side wall of the outer gimbal support; wherein in a case that the second driving coil group is energized with current, an interaction force is generated between the second driving coil group and the second magnet group, and the second magnet group is configured to drive, based on the interaction force, the gimbal carrier to rotate relative to the inner gimbal support along the third axis.

20. The electronic device according to claim 19, further comprising:

a second position feedback element group, configured to detect a rotation amount of the gimbal carrier relative to the inner gimbal support along the third axis, wherein the second position feedback element group is disposed within a magnetic field range of the second magnet group and the second driving coil group.

* * * * *